United States Patent Office 3,194,804
Patented July 13, 1965

3,194,804
19-NORCARD-20(22)-ENOLIDES, DERIVATIVES THEREOF, AND INTERMEDIATES THERETO
John S. Baran, Morton Grove, Ill., assignor to G. D. Searle & Co., Chicago, Ill., a corporation of Delaware
No Drawing. Filed July 2, 1963, Ser. No. 292,439
16 Claims. (Cl. 260—239.57)

The present invention is concerned with novel cardiac-active agents possessing the cardanolide and card-20(22)-enolide structure and characterized further by the presence of a carboxylic or carboxylic ester function or a hydrogen atom at the C–10 position. These compounds are more particularly designated as the 14β-hydroxy and Δ14 derivatives of a compound of the formula

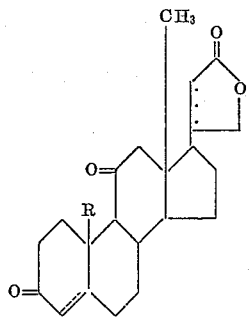

wherein R can be hydrogen or a carboxy or carb(lower alkoxy) radical, and the dotted lines indicate that the 4,5 and 20,22 linkages are optionally singly or doubly bonded.

The lower alkoxy radicals encompassed in the foregoing R term are exemplified by methoxy, ethoxy, propoxy, butoxy, pentyloxy, hexyloxy, and the branched-chain groups isomeric therewith.

The card-20(22)-enolide derivatives of the present invention can be manufactured by utilizing 11β,19-epoxy-11α,14-dihydroxy-3-oxocarda-4,20(22)-dienolide as the starting material. Oxidation of the C–19 hydroxylic function, suitably by means of aqueous chromic acid in a suitable water-miscible polar organic solvent such as acetic acid, results in 10β-carboxy-14-hydroxy-3,11-dioxo-19-norcarda-4,20(22)-dienolide. Esterification of the carboxy group of the latter substance, typically by reaction with a diazoalkane, affords the corresponding 10β-carb(lower alkoxy) derivatives. The use of an ethereal solution of diazomethane, for example, eventuates in 10β-carbomethoxy-14 - hydroxy-3,11-dioxo-19-norcarda-4,20(22)-dienolide. Decarboxylation of that carboxylic acid, on the other hand, typically by heating with dilute hydrochloric acid in methanol, produces 14-hydroxy-3,11-dioxo-19-norcarda-4,20(22)-dienolide.

The Δ14 compounds of the present invention are conveniently obtained by dehydration of the corresponding 14-hydroxy substances. As a specific example, the aforementioned 14-hydroxy-3,11-dioxo-19-norcarda-4,20(22)-dienolide is submitted to the action of a suitable dehydrating medium such as thionyl chloride in pyridine to yield 3,11-dioxo-19-norcarda-4,14,20(22)-trienolide.

Reduction of the 4,5-double bond of the instant compounds results in the corresponding 4,5-dihydro derivatives. A convenient means of reduction involves catalytic hydrogenation with a suitable catalyst such as palladium-on-carbon. By such a process, 3,11-dioxo-19-norcarda-4,14,20(22)-trienolide, for example, is converted to 3,11-dioxo-19-norcarda-14,20(22)-dienolide.

The compounds of the present invention lacking the 20(22) double bond are obtained by utilizing intermediates represented by the formula

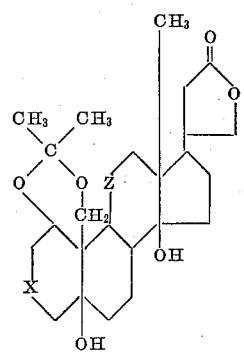

wherein X represents a carbonyl or a β-hydroxymethylene group and Z is symbolic of a carbonyl or α-hydroxymethylene radical, and also intermediates comprising the Δ1-5β-hydroxy, 5β-hydroxy, and Δ4-derivatives of a compound of the formula

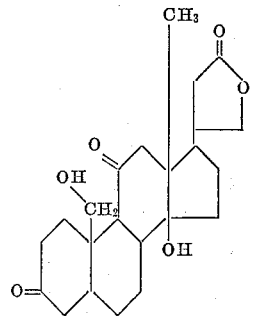

A starting material suitable for the manufacture of the aforementioned intermediates is 1β,3β,5β,11α,14,19-hexahydroxycard-20(22)-enolide 1,19-acetonide. Its preparation is described by Mannich and Stewart at Berichte, 75, 737 (1942). The corresponding cardanolide, wherein X and Z of the foregoing structural formula are hydroxymethylene groups, is obtained by catalytic hydrogenation of the latter substance suitably with a platinum oxide catalyst. Oxidation of that cardanolide, for example with chromium trioxide in pyridine, produces the corresponding 3,11-dioxo compound, 1β,5β,14,19-tetrahydroxy-3,11-dioxocardanolide, 1,19-acetonide, and the corresponding 11-oxo derivative, 1β,3β,5β,14,19-pentahydroxy-11-oxocardanolide 1,19-acetonide. Cleavage of the acetonide grouping of the latter substance can be effected by heating with hydrogen bromide in aqueous methanol to afford 1β,3β,5β,14,19-pentahydroxy-11-oxocardanolide. Dehydration of the aforesaid-mentioned 1β,5β,14,19-tetrahydroxy-3,11-dioxocardanolide 1,19-acetonide, on the other hand, affords 5β,14,19-trihydroxy-3,11-dioxocard- 1-enolide. Catalytic hydrogenation of this substance, suitably in methanol with 5% palladium-on-carbon catalyst, results in 5β,14,19-trihydroxy-3,11 - dioxocardanolide. Heating of that derivative in a suitable dehydrating medium such as acetic acid affords the corresponding Δ⁴ compound, 14,19 - dihydroxy - 3,11 - dioxocard-4-enolide. The latter intermediate can be converted to the analogous derivatives described above in the Δ²⁰⁽²²⁾ series. The aforementioned oxidation process with aqueous chromic acid in acetic acid, for example, affords 10β-carboxy-14-hydroxy-3,11-dioxocard-4-enolide.

The 19-nor, 19-carboxy-19-nor, and 19-carb(lower alkoxy)-19-nor compounds of the present invention are useful in view of their valuable pharmacological properties. As is mentioned above, they are, in particular, cardiac-active agents.

The invention will appear more fully from the examples which follow. These examples are given by way of illustration only and are not to be construed as limiting the invention either in spirit or in scope as many modifications both in materials and methods will be apparent to those skilled in the art. In these examples, temperatures are given in degrees centigrade (° C.) and quantities of materials in parts by weight unless otherwise noted.

*Example 1*

A mixture of 1.92 parts of 1β,3β,5β,11α,14,19-hexahydroxycard-20(22)-enolide 1,19-acetonide, 0.16 part of platinum oxide catalyst, and 60 parts of ethanol is stirred in a hydrogen atmosphere at room temperature and atmospheric pressure for about 6 hours. The catalyst is removed by filtration, and the filtrate is evaporated to dryness under reduced pressure to afford a residue which is triturated with acetone, resulting in crystalline 1β,3β,5β,11α,14,19 - hexahydroxycardanolide 1,19 - acetonide, melting at 285–290°. A pure sample is obtained by recrystallization from acetone, that material melting at about 290–292°. It is characterized further by an optical rotation of +17.5° in dioxane and by infrared absorption maxima at about 2.88 and 5.64 microns. This compound is represented by the structural formula

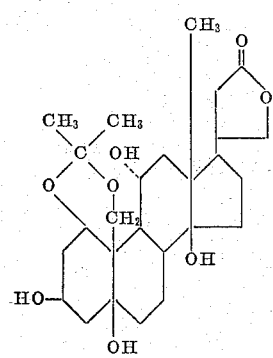

*Example 2*

To a mixture of 10 parts of chromium trioxide and 100 parts of pyridine is added, with stirring at room temperature, a solution of 9.6 parts of 1β,3β,5β,11α,14,19-hexahydroxycardanolide 1,19-acetonide in 100 parts of pyridine. This reaction mixture is stirred for about 18 hours longer, then is filtered. The filter cake is washed with pyridine, then with chloroform, and the filtrate is diluted with chloroform, then is washed with water. The aqueous layer is separated, and is washed with chloroform. The combined filtrate and chloroform washings are dried over anhydrous sodium sulfate, then are concentrated to dryness at reduced pressure. The resulting brown residue is triturated with acetone to yield 1β,5β,14,19-tetrahydroxy-3,11-dioxocardanolide 1,19-acetonide, melting at about 270–274° with decomposition. It displays an optical rotation of +10.5° in pyridine and also infrared absorption maxima at about 2.83, 5.68, 5.81, and 5.84 microns. This compound is characterized further by the structural formula

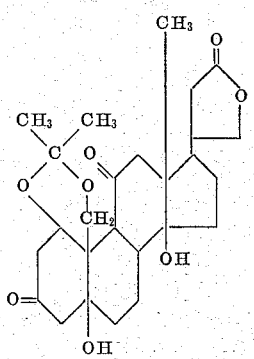

The acetone mother liquors from the foregoing crystallizations are chromatographed on a silica gel column and eluted with 4% methanol in chloroform to afford 1β,3β,5β,14,19-pentahydroxy-11-oxocardanolide 1,19-acetonide, which substance melts at about 293–295°, displays an optical rotation of −5.05° in pyridine, and is characterized further by infrared absorption maxima at about 2.85, 5.64, and 5.82 microns. This compound can be represented by the structural formula

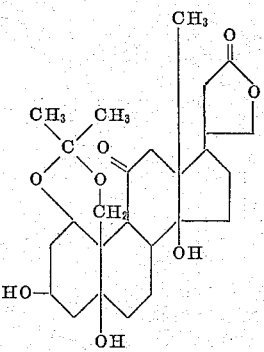

*Example 3*

A solution of one part of 1β,3β,5β,14,19-pentahydroxy-11-oxocardanolide 1,19-acetonide in 50 parts of water and 80 parts of methanol containing a trace of hydrogen bromide is heated at the reflux temperature for about 4 hours, then is cooled and evaporated to dryness at reduced pressure. The crystalline residue is recrystallized from isopropyl alcohol to afford 1β,3β,5β,14,19-pentahydroxy-11-oxocardanolide, melting at about 212–224° and characterized also by infrared absorption maxima at about 2.97–3.15 and 5.61 microns. It is characterized further by the structural formula

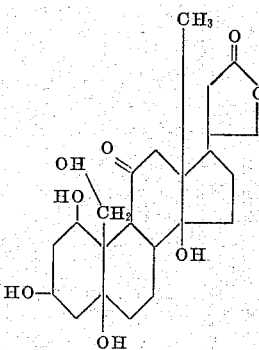

Example 4

A mixture of one part of 1β,5β,14,19-tetrahydroxy-3,11-dioxocardanolide 1,19-acetonide, 8 parts of Woelm basic alumina, and 40 parts of ethanol is stirred at the reflux temperature for about 1¼ hours. The alumina is collected by filtration and is stirred with hot ethanol for about 30 minutes, then is again removed by filtration. The combined ethanol filtrates are concentrated to dryness at reduced pressure, and the resulting residue is triturated with acetone to afford 5β,14,19-trihydroxy-3,11-dioxocard-1-enolide, melting at about 165–170°. Adsorption of a chloroform solution of this material on a silica gel chromatographic column followed by elution with 10% methanol in choloform and recrystallization from acetone effords a pure sample, melting at about 212–216°. It displays an optical rotation of +131.9° in dioxane and an ultraviolet absorption maximum at about 232 millimicrons with a molecular extinction coefficient of about 11,000. This substance is further characterized by the structural formula

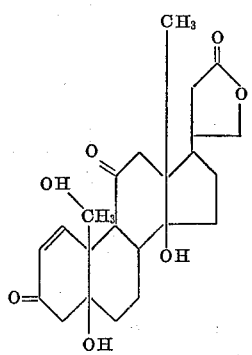

Example 5

A mixture of 2.2 parts of 5β,14,19-trihydroxy-3,11-dioxocard-1-enolide, 0.4 part of 5% palladium-on-carbon catalyst, and 100 parts of methanol is stirred in a hydrogen atmosphere at atmospheric pressure until the uptake of gas ceases. The catalyst is removed by filtration, and the filtrate is evaporated to dryness at reduced pressure. The resulting residue is dissolved in a mixture of ethyl acetate and methanol, and this organic solution is evaporated slowly at about 35° to afford crystals of 5β,14,19-trihydroxy - 3,11-dioxocardanolide, melting at about 232–234° with decomposition. Recrystallization from a mixture of ethyl acetate and methanol affords a pure sample, melting at about 234–236° with decomposition. It is characterized further by an optical rotation of +36.2° in dioxane, by infrared absorption maxima at about 2.80, 2.85, 2.90, 5.64, and 5.90 microns and also by the structural formula

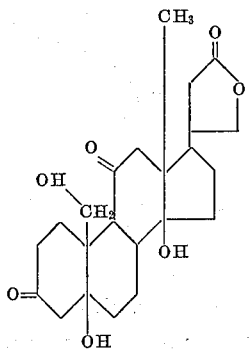

Example 6

A solution of one part of 5β,14,19-trihydroxy-3,11-dioxocardanolide in 63 parts of acetic acid is heated at the reflux temperature for about 15 minutes, then is concentrated to dryness at reduced pressure. The resulting residue it triturated with acetone to afford crystals of 14,19 - dihydroxy - 3,11 - dioxocard-4-enolide, melting at about 245–250°. Further purification is affected by crystallization from a mixture of ethyl acetate and acetone, resulting in a sample of the pure substance, melting at about 246–250°. An ultraviolet absorption maximum is observed at about 242 millimicrons with a molecular extinction coefficient of about 14,400, and infrared absorption peaks are displayed at about 2.80, 2.93, 5.63, 5.82, and 6.08 microns. This substance is further characterized by the structural formula

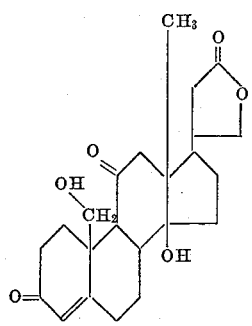

Example 7

To a solution of 2 parts of 11β,19-epoxy-11α,14-dihydroxy-3-oxocarda-4,20(22)-dienolide in 94.5 parts of acetic acid is added with stirring over a period of about 10 minutes, 2.75 parts by volume of an aqueous solution, 8 N in chromium trioxide and 8 N in sufuric acid. The excess oxidant is destroyed by the addition of a small quantity of isopropyl alcohol, and the resulting mixture is diluted with about 100 parts of water. This aqueous mixture is allowed to stand for about 10 minutes, after which time the precipitated solid is collected by filtration, washed on the filter with water, and dried to afford 10β-carboxy - 14 - hydroxy-3,11-dioxo-19-norcarda-4,20(22)-dienolide, melting at about 189–190° with decomposition. Recrystallization from acetone affords a pure sample, melting at about 189–191° with decomposition and characterized further by an optical rotation of +229.5° in a 1:1 mixture of methanol and dioxane. Infrared absorption peaks are observed at about 2.88, 3.23, 3.38, 5.69–5.82, 6.00, and 6.18 microns. This compound is represented by the structural formula

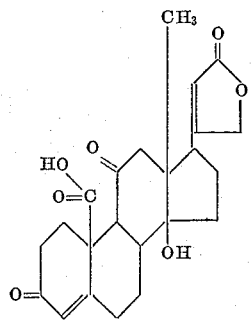

Example 8

To 6 parts of 10β-carboxy-14β-hydroxy-3,11-dioxo-19-norcarda-4,20(22)-dienolide in 48 parts of methane is added an ethereal solution of diazomethane until the yellow color persists. This reaction mixture is then evaporated to dryness under reduced pressure, and the resulting residue is triturated with methanol to afford crystals of 10β-carbomethoxy-14-hydroxy-3,11-dioxo-19-norcarda-4,20(22)-dienolide, melting at about 225–250°. Crystallization of this material from a mixture of methylene chloride and methanol results in the pure substance having a melting point of about 256–258°. It is characterized further by infrared absorption maxima at about 2.88, 3.37, 5.72–5.81, 6.00, and 6.17 microns and also by the structural formula

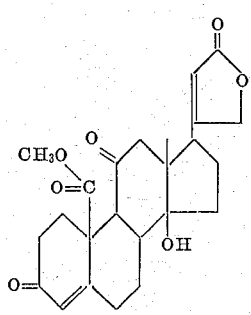

Example 9

The substitution of an equivalent quantity of diazoehtane in the procedure of Example 8 results in 10β-carbethoxy-14-hydroxy-3,11-dioxo-19-norcarda-4,20(22) - dienolide.

Example 10

A mixture of one part of 10β-carboxy-14-hydroxy-3, 11 - dioxo - 19 - norcarda-4,20(22)-dienolide, one part by volume of 3 N hydrochloric acid, 12 parts of methanol, and 5 parts of water is heated with stirring at the reflux temperature for about 65 minutes. A stream of nitrogen is passed into the mixture at about 90°, and the resulting concentrated solution is cooled to room temperature. The solid which precipitates is collected by filtration, washed on the filter with aqueous methanol and dried, resulting in 14 - hydroxy-3,11-dioxo-19-norcarda-4,20(22) - dienolide, melting at about 228–245°. This material is decolorized with activated carbon, then is recrystallized from a mixture of methylene chloride and ethyl acetate to afford a sample of the pure substance, melting at about 255–257°. It displays an optical rotation of +180° in chloroform and infrared absorption maxima at about 2.82, 2.94, 3.39, 5.72, 5.87, 6.02, and 6.16 microns. It is characterized also by the structural formula

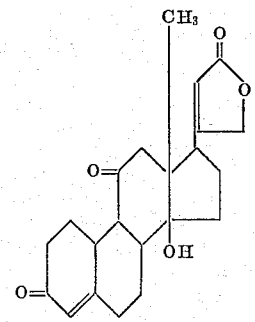

Example 11

To a solution of 2.08 parts of 14-hydroxy-3,11-dioxo-19-norcarda-4,20(22)-dienolide in 20 parts of pyridine is added, at −35° with stirring, a solution of 0.73 part of thionyl chloride in 10 parts of pyridine. After the addition has been completed, the reaction mixture is allowed to warm to about 10° over a period of about 20 minutes, then is diluted with chloroform and washed with saturated aqueous sodium bicarbonate. Drying over anhydrous sodium sulfate affords an organic solution which is concentrated to dryness at reduced pressure. The resulting crystalline residue is decolorized with activated carbon, then is recrystallized from acetone to afford colorless crystals of 3,11-dioxo-19-norcarda-4,14,20(22)-trienolide, melting at about 230–235°. A pure sample of this substance is obtained by further recrystallization from acetone, resulting in material melting at about 227–231°. This compound is further characterized by infrared absorption maxima at about 3.40, 5.61, 5.72, 5.85, 6.02, and 6.13 microns. It is represented by the structural formula

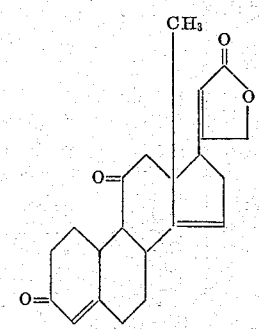

Example 12

A mixture of 5.9 parts of 3,11-dioxo-19-norcarda-4-14, 20(22)-trienolide, 1.5 parts of 5% palladium-on-carbon catalyst, 320 parts of methanol, and 360 parts of ethyl acetate is stirred in a hydrogen atmosphere at atmospheric pressure and room temperature until the uptake of hydrogen ceases. The catalyst is removed by filtration, and the filtrate is concentrated to dryness under reduced pressure. The resulting residue is adsorbed on a silica gel chromatographic column, then is eluted with 15% ethyl acetate in benzene. The eluate is concentrated to dryness, and the resulting solid is recrystallized from a mixture of acetone and hexane to afford 3,11-dioxo-19-norcarda-14,20(22) dienolide, melting at about 215–218°. This material is a mixture of 3,11 - dioxo-19-5α-carda-14,20(22) - dienolide and 3,11 - dioxo-19 - nor-5β-carda-14,20(22)-dienolide and is represented by the structural formula

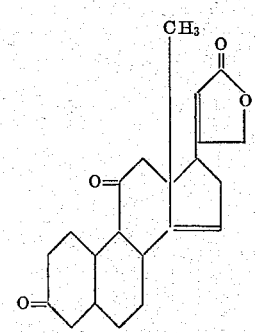

Example 13

The substitution of 2 parts of 14,19-dihydroxy-3,11-dioxocard-4-enolide in the procedure of Example 7 results in 10β-carcoxy-14 - hydroxy - 13,11-dioxo-19 - norcard-4-enolide. It is characterized by infrared absorption maxima at about 2.87, 2.90–4.00, 3.39, 5.64, 5.82, 5.99, 6.13, 8.46, and 10.32 microns, and also by the structural formula

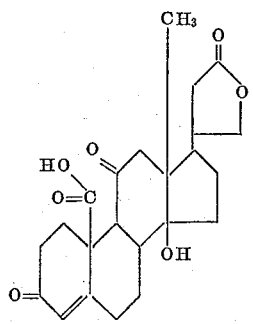

*Example 14*

By substituting 6 parts of 10β-carboxy-14-hydroxy-3,11-dioxo-19-norcard-4-enolide and otherwise proceeding according to the processes described in Example 8, 10β-carbomethoxy-14 - hydroxy - 3,11 - dioxo-19-norcard-4-enolide is obtained. It can be represented by the structural formula

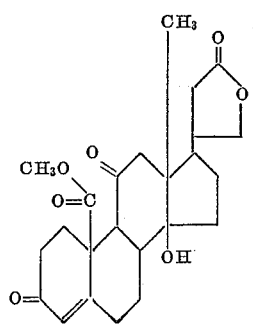

*Example 15*

When one part of 10β-carboxy-14-hydroxy-3,11-dioxo-19-norcard-4-enolide is submitted to the procedure of Example 10, 14-hydroxy-3,11-dioxo-19-norcard-4-enolide is produced. It displays infrared absorption maxima at about 2.88, 3.39, 5.64, 5.83, 6.00, 6.12, 8.48, and 9.80 microns and is characterized further by the structural formula

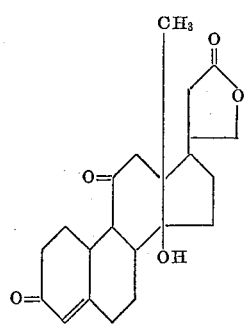

*Example 16*

The dehydration of 2.08 parts of 14-hydroxy-3,11-dioxo-19-norcard-4-enolide by the procedure described in Example 11 results in 3,11-dioxo-19-norcarda-4,14-dienolide of the structural formula

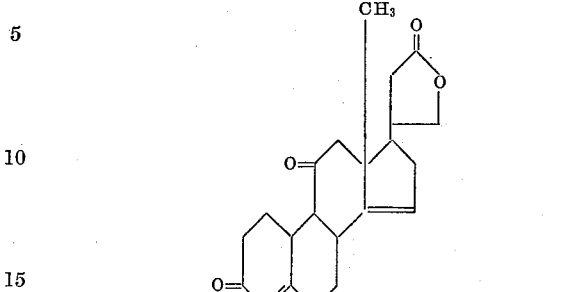

*Example 17*

By the substitution of 5.9 parts of 3,11-dioxo-19-norcarda-4,14-dienolide in the hydrogenation process of Example 12, 3,11-dioxo-19-norcard-14-enolide is produced. It can be represented by the structural formula

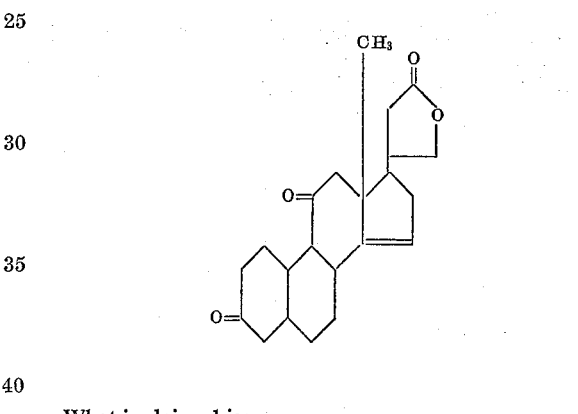

What is claimed is:
1. A member selected from the class consisting of the 14β-hydroxy and Δ¹⁴ derivatives of a compound of the formula

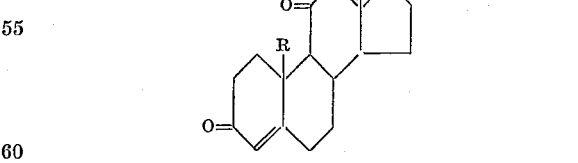

wherein R is selected from the group consisting of hydrogen, carboxy, and carb(lower alkoxy) radicals, and the dotted line indicates the optional presence of a double bond between carbon atoms 20 and 22.
2. 10β-carboxy - 14 - hydroxy-3,11-dioxo-19-norcarda-4,20(22)-dienolide.
3. 10β - carbomethoxy - 14 - hydroxy-3,11-dioxo-19-norcarda-4,20(22)-dienolide.
4. 14 - hydroxy - 3,11 - dioxo-19-norcarda-4,20(22)-dienolide.
5. 3,11-dioxo-19-norcarda-4,14,20(22)-trienolide.
6. 3,11-dioxo-19-norcarda-14,20(22)-dienolide.
7. 10β-carboxy - 14 - hydroxy-3,11-dioxo-19-norcard-4-enolide.

8. A compound of the formula

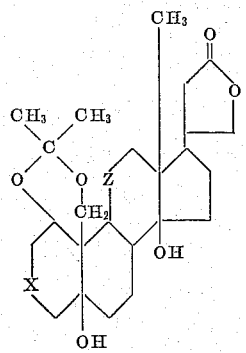

wherein X is selected from the group of radicals consisting of carbonyl and β-hydroxymethylene, and Z is a member of the class of radicals consisting of carbonyl and α-hydroxymethylene.

9. 1β,3β,5β,11α,14,19 - hexahydroxycardanolide 1,19-acetonide.

10. 1β,5β,14,19-tetrahydroxy - 3,11 - dioxocardanolide 1,19-acetonide.

11. 1β,3β,5β,14,19-pentahydroxy - 11 - oxocardanolide 1,19-acetonide.

12. 1β,3β,5β,14,19-pentahydroxy-11-oxocardanolide.

13. A member selected from the class consisting of the $\Delta^1$-5β-hydroxy, 5β-hydroxy, and $\Delta^4$ derivatives of a compound of the formula

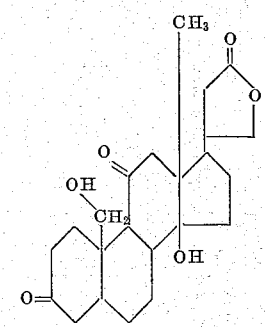

14. 5β,14,19-trihydroxy-3,11-dioxocard-1-enolide.
15. 5β,14,19-trihydroxy-3,11-dioxocardanolide.
16. 14,19-dihydroxy-3,11-dioxocard-4-enolide.

References Cited by the Examiner
UNITED STATES PATENTS

| | | | |
|---|---|---|---|
| 2,813,107 | 11/57 | Reichstein | 260—397.45 |
| 2,946,786 | 7/60 | Baran | 260—239.57 |
| 2,976,284 | 3/61 | Baran | 260—239.55 |

LEWIS GOTTS, *Primary Examiner.*